US012632387B2

(12) United States Patent
Walker

(10) Patent No.: US 12,632,387 B2
(45) Date of Patent: May 19, 2026

(54) MANAGING ACCESS GRANULARITY IN A CACHE OF A MEMORY SUB-SYSTEM

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 18/759,089

(22) Filed: Jun. 28, 2024

(65) Prior Publication Data

US 2025/0021485 A1 Jan. 16, 2025

Related U.S. Application Data

(60) Provisional application No. 63/526,580, filed on Jul. 13, 2023.

(51) Int. Cl.
| | |
|---|---|
| *G06F 12/00* | (2006.01) |
| *G06F 12/02* | (2006.01) |
| *G06F 12/0871* | (2016.01) |
| *G06F 12/0891* | (2016.01) |

(52) U.S. Cl.
CPC ...... *G06F 12/0871* (2013.01); *G06F 12/0246* (2013.01); *G06F 12/0891* (2013.01)

(58) Field of Classification Search
CPC ............. G06F 12/0871; G06F 12/0246; G06F 12/0891; G06F 12/0895
USPC ......................................... 711/118
See application file for complete search history.

(56) References Cited

U.S. PATENT DOCUMENTS

| | | | | |
|---|---|---|---|---|
| 2005/0278486 A1* | 12/2005 | Trika | ................. | G06F 12/0866 711/143 |
| 2021/0157727 A1* | 5/2021 | Meyerowitz | ........ | G06F 12/0804 |

FOREIGN PATENT DOCUMENTS

| | | | | | |
|---|---|---|---|---|---|
| CN | 116804975 A | * | 9/2023 | ......... | G06F 12/0802 |
| KR | 20150076200 A | * | 7/2015 | ......... | G06F 12/0802 |

\* cited by examiner

*Primary Examiner* — Mardochee Chery
(74) *Attorney, Agent, or Firm* — Lowenstein Sandler LLP

(57) ABSTRACT

A processing device, operatively coupled with a memory device, retrieves data from the memory device for merging at one or more sectors of a cache line in a cache, wherein the cache line comprises a plurality of sectors. The processing device determines, based on one or more bits associated with each sector of the cache line, whether each sector of the cache line is configured with at least one of a write protection mode and enable mode, respectively. The processing device writes the data from the memory device to each sector of the cache line using the at least one of the write protection mode or the enable mode.

20 Claims, 6 Drawing Sheets

200

300
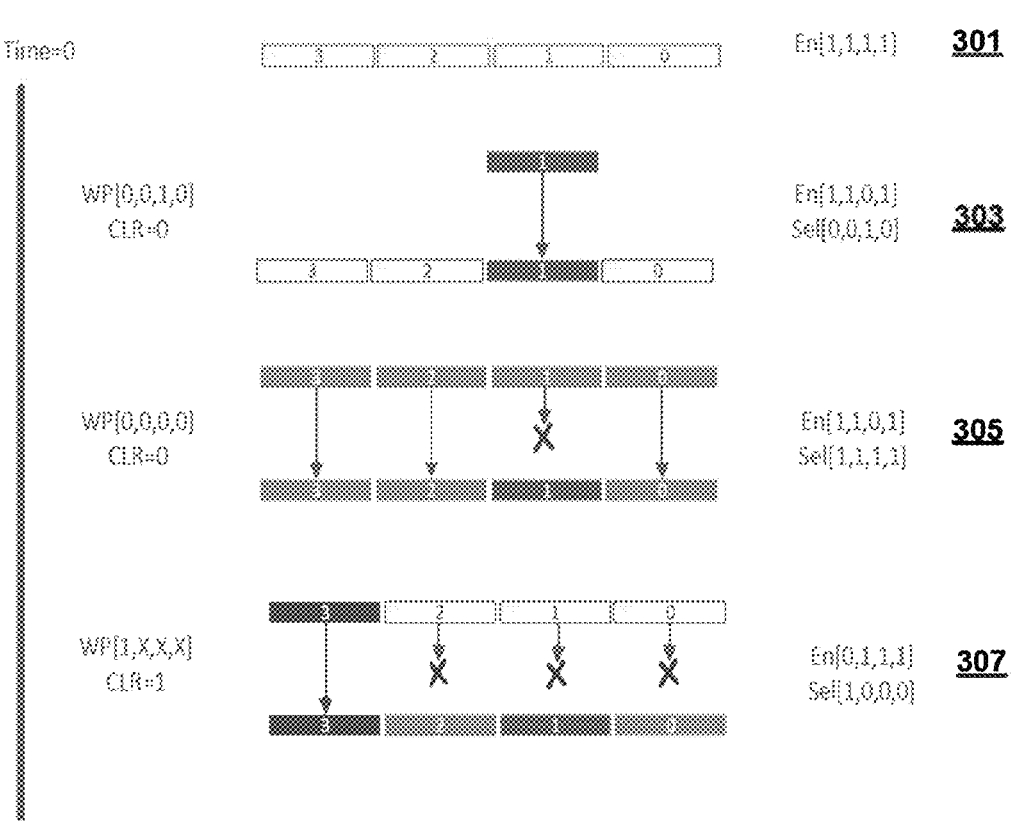
FIG. 3

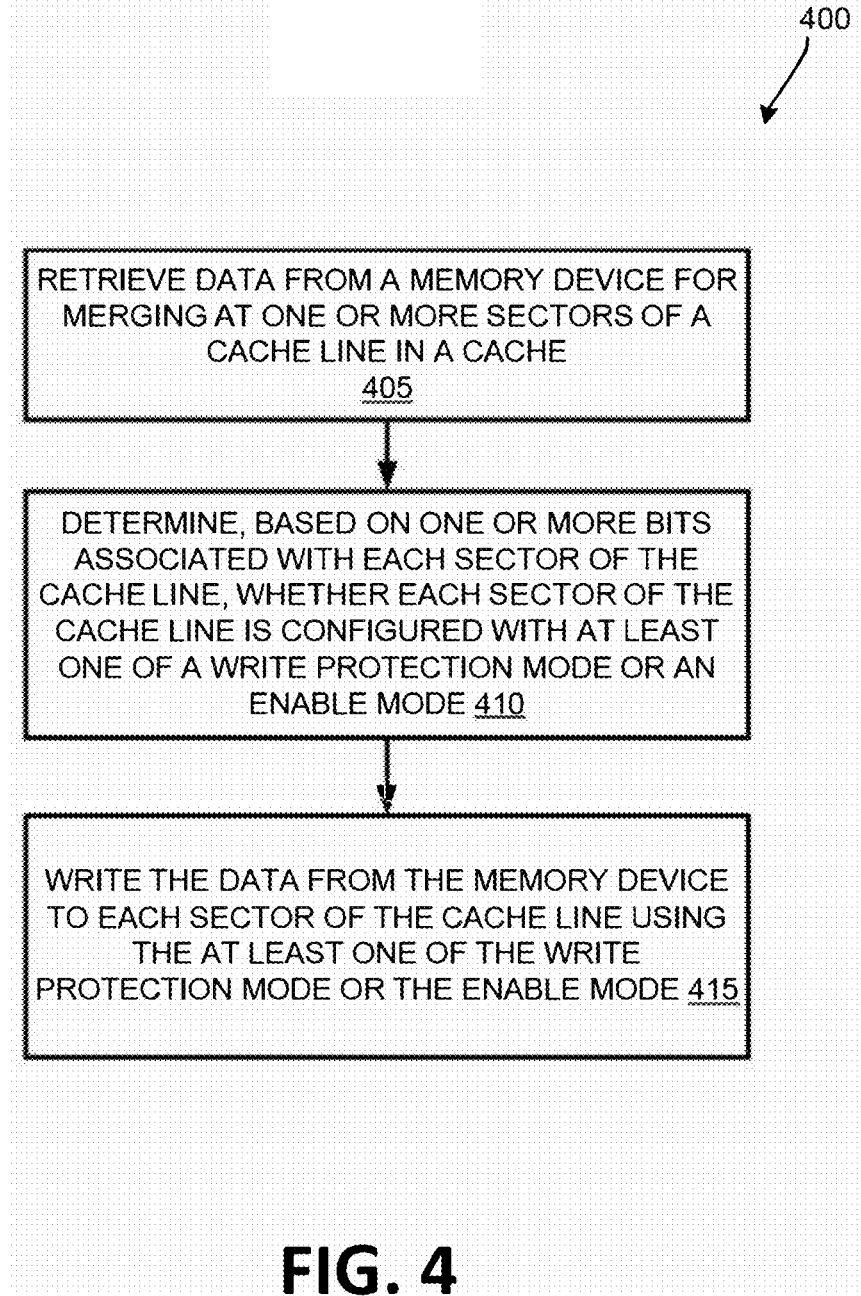

400

RETRIEVE DATA FROM A MEMORY DEVICE FOR MERGING AT ONE OR MORE SECTORS OF A CACHE LINE IN A CACHE
405

DETERMINE, BASED ON ONE OR MORE BITS ASSOCIATED WITH EACH SECTOR OF THE CACHE LINE, WHETHER EACH SECTOR OF THE CACHE LINE IS CONFIGURED WITH AT LEAST ONE OF A WRITE PROTECTION MODE OR AN ENABLE MODE 410

WRITE THE DATA FROM THE MEMORY DEVICE TO EACH SECTOR OF THE CACHE LINE USING THE AT LEAST ONE OF THE WRITE PROTECTION MODE OR THE ENABLE MODE 415

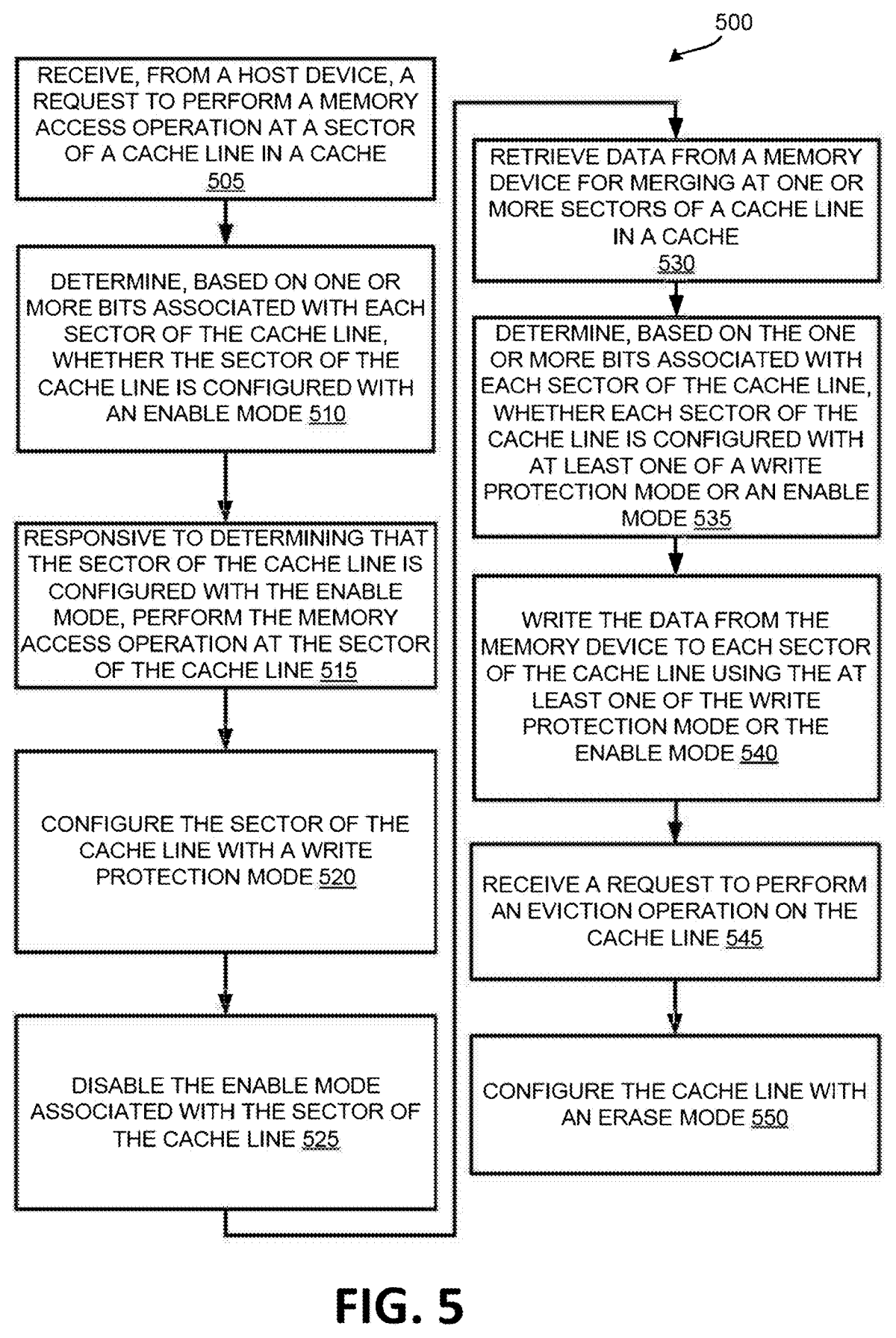

RECEIVE, FROM A HOST DEVICE, A REQUEST TO PERFORM A MEMORY ACCESS OPERATION AT A SECTOR OF A CACHE LINE IN A CACHE 505

DETERMINE, BASED ON ONE OR MORE BITS ASSOCIATED WITH EACH SECTOR OF THE CACHE LINE, WHETHER THE SECTOR OF THE CACHE LINE IS CONFIGURED WITH AN ENABLE MODE 510

RESPONSIVE TO DETERMINING THAT THE SECTOR OF THE CACHE LINE IS CONFIGURED WITH THE ENABLE MODE, PERFORM THE MEMORY ACCESS OPERATION AT THE SECTOR OF THE CACHE LINE 515

CONFIGURE THE SECTOR OF THE CACHE LINE WITH A WRITE PROTECTION MODE 520

DISABLE THE ENABLE MODE ASSOCIATED WITH THE SECTOR OF THE CACHE LINE 525

RETRIEVE DATA FROM A MEMORY DEVICE FOR MERGING AT ONE OR MORE SECTORS OF A CACHE LINE IN A CACHE 530

DETERMINE, BASED ON THE ONE OR MORE BITS ASSOCIATED WITH EACH SECTOR OF THE CACHE LINE, WHETHER EACH SECTOR OF THE CACHE LINE IS CONFIGURED WITH AT LEAST ONE OF A WRITE PROTECTION MODE OR AN ENABLE MODE 535

WRITE THE DATA FROM THE MEMORY DEVICE TO EACH SECTOR OF THE CACHE LINE USING THE AT LEAST ONE OF THE WRITE PROTECTION MODE OR THE ENABLE MODE 540

RECEIVE A REQUEST TO PERFORM AN EVICTION OPERATION ON THE CACHE LINE 545

CONFIGURE THE CACHE LINE WITH AN ERASE MODE 550

FIG. 5

MANAGING ACCESS GRANULARITY IN A CACHE OF A MEMORY SUB-SYSTEM

RELATED APPLICATIONS

This application is a continuation of U.S. Patent Application No. 63/526,580 filed Jul. 13, 2023, the entire contents of which are hereby incorporated by reference herein.

TECHNICAL FIELD

Embodiments of the disclosure relate generally to memory sub-systems, and more specifically, relate to managing access granularity in a cache of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block diagram illustrating examples of managing access granularity in a cache of a memory sub-system, in accordance with some embodiments of the present disclosure.

FIG. 4 is a flow diagram of an example method of managing access granularity in a cache of a memory device, in accordance with some embodiments of the present disclosure.

FIG. 5 is a flow diagram of an example method of managing access granularity in a cache of a memory device, in accordance with some embodiments of the present disclosure.

DETAILED DESCRIPTION

Figure 1:
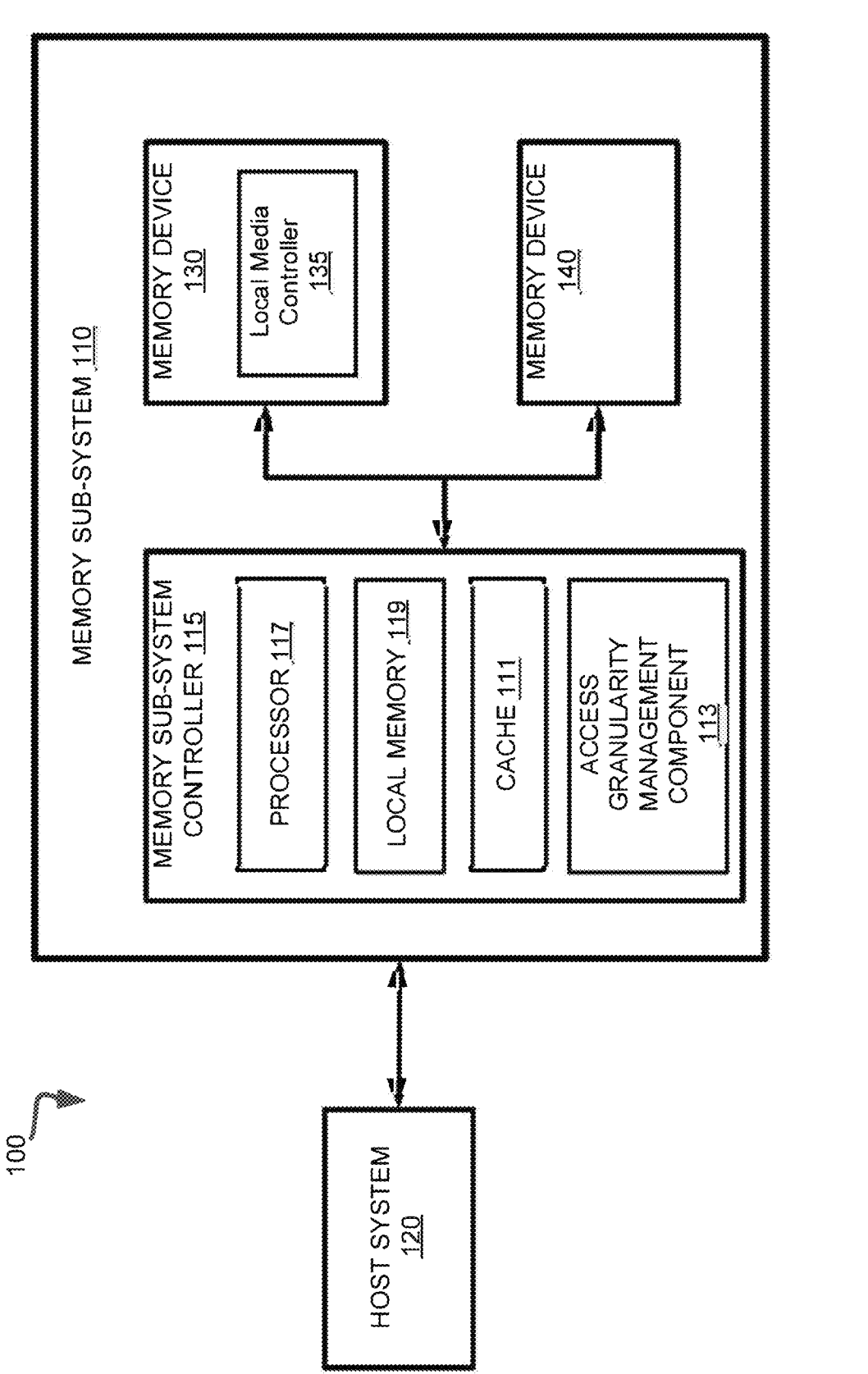
FIG. 1 illustrates an example computing system that includes a memory sub-system, in accordance with some embodiments of the present disclosure.

Aspects of the present disclosure are directed to managing access granularity in a cache of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The host system can send access requests (e.g., write command, read command) to the memory sub-system, such as to store data on a memory device of the memory sub-system and to read data from the memory device. The data to be read or written, as specified by a host request, is hereinafter referred to as "host data." A host request can include logical address information (e.g., logical block address ((LBA), namespace) for the host data, which is the location that the host system associates with the host data. The logical address information (e.g., LBA, namespace) can be part of metadata for the host data. Metadata, host data, and parity data, which is used for error correction, can form an error correction code (ECC) codeword. Metadata can also include data version (e.g., used to distinguish age of data written), valid bitmap (which LBAs or logical transfer units contain valid data), etc.

Certain memory sub-systems utilize a buffer and/or cache (hereinafter referred to as "cache") to improve the performance of the memory sub-system. A cache can be a type of memory where data can be retrieved in less time than when data is to be retrieved from a backing store (e.g., a memory device) of the memory sub-system. The cache can store data from the backing store that has recently been read or written by the host system. For example, the cache can store data that has recently been written to the memory device or data that has recently been read from the memory device.

The cache includes multiple cache lines where each cache line includes a group of data organized into sectors. For example, each sector can include data that is associated with a read operation or a write operation from the host system. In some embodiments, the data from read operations or write operations from the host system can be separated into multiple sectors based on a management unit size utilized by the memory device of the memory sub-system. The memory device can be associated with a protocol that specifies the size of the management unit. For example, each sector can store 64 bytes ("64B") of data.

In certain memory sub-systems, the host system and the memory device can each have different data access granularities. For example, the host system can request data from memory in segments that are 64 bytes in size, while the memory sub-system can retrieve data from the backing store in segments that are 256 bytes in size. Thus, there can be a mismatch in the size of data being requested and the size of data being retrieved.

Certain memory sub-systems handle conflicts in access granularity management by using a buffer and/or cache to store the extra data from the data retrieved from memory. For example, the host system can send a write request to a memory sub-system. A memory sub-system controller can store the data (e.g., the 64 bytes of data) from the write request to a sector of a cache line of the cache. The memory sub-system controller can then perform the write request and fetch (e.g., retrieve) data from the backing store. The data retrieved from the backing store, as described above, can typically be a larger size than the data from the host write request. For example, the data retrieved can be 256 bytes of data in size. The memory sub-system controller can merge the data retrieved from the backing store with the data from the write request stored at the sector of the cache line. In order to avoid overwriting the data from the write request at the sector of the cache line, certain memory sub-systems use a secondary data structure, such as a look-up table, in order to look up which sectors of the cache line are dirty (e.g., which sectors of the cache line are more recent than the data retrieved from the backing store data). The memory sub-system controller can thus merge the data retrieved from the backing store with the data at each sector of the cache line in the cache without overwriting the data from the host write request. However, using an additional look-up table typically consumes time and power to perform because the memory sub-system controller reads the cache line, modifies the cache line after performing an additional look-up, and then writes to the cache line. In addition, using an additional look-up table can cause the need for extra resources and buffering in the memory sub-system. As such, the performance of the memory sub-system can be impacted.

Aspects of the present disclosure address the above and other deficiencies by managing access granularity in a cache of a memory sub-system. In some embodiments, a memory sub-system controller retrieves data from a backing store (e.g., a memory device) for merging at one or more sectors of a cache line in a cache. The memory sub-system controller can determine whether each sector of the cache line is configured with a write protection mode and/or an enable mode, e.g., whether each sector of the cache line has a write protection mode enabled and/or an enable mode enabled. In some embodiments, the memory sub-system controller can determine that the write protection mode and/or enable mode is enabled or disabled based on one or more bits that are associated with each sector of the cache line. In some embodiments, each sector can be controlled (e.g., updated, modified, etc.) by one or more bits associated with the sector. The one or more bits associated with each sector can be part of an array of bits that form a control signal. In some embodiments, applying a control signal to each sector can enable or disable each bit of the one or more bits of each sector of the cache line. In some embodiments, the memory sub-system controller can write the data from the backing store to each sector of the cache line based on whether the write protection mode and/or enable mode is enabled or disabled for each respective sector of the cache line. For example, if the memory sub-system controller determines that the write protection mode is disabled for a sector of the cache line, the memory sub-system controller can write the data from the backing store to that sector of the cache line. If the memory sub-system controller determines that the write protection mode is enabled for a sector of the cache line, the data from the backing store is not written to that sector. In some embodiments, if the memory sub-system controller determines that the enable mode is enabled for a sector of the cache line, the memory sub-system controller can write the data from the backing store to that sector of the cache line. If the memory sub-system controller determines that the enable mode is disabled for a sector of the cache line, the data from the backing store is not written to that sector.

In some embodiments, the memory sub-system controller can receive a request from a host device to perform a memory access operation (e.g., a write operation, read operation, etc.) at a sector of the cache line in the cache. The memory sub-system controller can determine whether the enable mode associated with the sector of the cache line is enabled or disabled. In some embodiments, the memory sub-system controller can determine that the enable mode is enabled based on one or more bits that are associated with the sector of the cache line. In response to determining that the enable mode is enabled, the memory sub-system controller can perform the memory access operation at the sector of the cache line (e.g., the memory sub-system controller can write data to the sector of the cache line). In some embodiments, in response to performing the memory access operation, the memory sub-system controller can enable the write protection mode associated with the sector of the cache line at which the memory access operation was performed. Enabling the write protection mode can include applying a control signal to the sector to enable the one or more bits associated with the sector. In some embodiments, in response to performing the memory access operation, the memory sub-system controller can disable the enable mode associated with the sector of the cache line at which memory access operation was performed. Disabling the enable mode can include applying a control signal to the sector to disable the one or more bits associated with the sector.

By applying control signals to enable and/or disable bits associated with each sector of a cache line in a cache, a memory sub-system controller can write data to a cache/buffer without the need for an additional look-up. Using an additional look-up table typically consumes time and power to perform because the memory sub-system controller reads the cache line in the cache, modifies the cache line after performing the additional look-up, and then writes to the cache line. There can thus be a decrease in the performance of the memory sub-system. Applying control signals while performing write operations on a cache line can improve performance because no additional look-up is needed. As such, writing to a cache using control signals to enable and/or disable bits can turn a read-modify-write process into a write-only process, which saves resources, time, and power, resulting in an overall increase in performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT)

enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The NVMe interface is a communications interface/protocol developed for SSDs to operate over a host system and a memory device that are linked over a PCIe interface. The NVMe protocol provides a command queue and completion path for access of data stored in memory devices by host system 120. In some embodiments, the interface between the host system and the memory device can implement one or more alternate protocols supported by another interface standard. For example, the interface can implement one or more alternate protocols supported by PCIe (e.g., non-PCIe protocols). In some embodiments, the interface can be represented by a compute express link (CXL) interface or any communication link that allows cache line granularity updates and shares coherency control with the processing device.

A CXL system is a cache-coherent interconnect for processors, memory expansion, and accelerators. A CXL system maintains memory coherency between the CPU memory space and memory on attached devices, which allows resource sharing for higher performance, reduced software stack complexity, and lower overall system cost. Generally, a CXL is an interface standard that can support a number of protocols that can run on top of PCIe, including a CXL.io protocol, a CXL.mem protocol, and a CXL.cache protocol. The CXL.io protocol is a PCIe-like protocol that can be viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include not- and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes an access granularity management component 113 that can be used to manage access granularity in a cache of a memory sub-system. In some embodiments, the access granularity management component 113 retrieves data from a backing store (e.g., the memory device 130) for merging at one or more sectors of a cache line in a cache (e.g., the cache 111), where the cache includes a set of sectors. The access granularity management component 113 can determine whether each sector of the cache line is configured with a write protection mode and/or enable mode, e.g., whether each sector of the cache line has a write protection mode enabled and/or an enable mode enabled. In some embodiments, the access granularity management component 113 can determine that the write protection mode and/or enable mode is enabled or disabled based on one or more bits that are associated with each sector of the cache line. In some embodiments, each sector can be controlled (e.g., updated, modified, etc.) by one or more bits associated with the sector. The one or more bits associated with each sector can be part of an array of bits that form a control signal. In some embodiments, applying a control signal to each sector can enable or disable each bit of the one or more bits associated with each sector of the cache line. In some embodiments, the access granularity management component 113 can write the data from the backing store to each sector of the cache line based on whether the write protection mode and/or enable mode is enabled or disabled for each respective sector of the cache line. For example, if the access granularity management component 113 determines that the write protection mode is disabled for a sector of the cache line, the access granularity management component 113 can write the data from the backing store to that sector of the cache line. If the access granularity management component 113 determines that the write protection mode is enabled for a sector of the cache line, the data from the backing store is not written to that sector. In some embodiments, if the access granularity management component 113 determines that the enable mode is enabled for a sector of the cache line, the access granularity management component 113 can write the data from the backing store to that sector of the cache line. If the access granularity management component 113 determines that the enable mode is disabled for a sector of the cache line, the data from the backing store is not written to that sector.

In some embodiments, the access granularity management component 113 can receive a request from a host device to perform a memory access operation (e.g., a write operation, read operation, etc.) at a sector of the cache line in the cache. The access granularity management component 113 can determine whether the enable mode associated with the sector of the cache line is enabled or disabled. In some embodiments, the access granularity management component 113 can determine that the enable mode is enabled based on one or more bits that are associated with the sector of the cache line. In response to determining that the enable mode is enabled, the access granularity management component 113 can perform the memory access operation at the sector of the cache line (e.g., the access granularity management component 113 can write data to the sector of the cache line). In some embodiments, in response to performing the memory access operation, the access granularity management component 113 can enable the write protection mode associated with the sector of the cache line at which the memory access operation was performed. Enabling the write protection mode can include applying a control signal to the sector to enable the one or more bits associated with the sector. In some embodiments, in response to performing the memory access operation, the access granularity management component 113 can disable the enable mode associated with the sector of the cache line at which the memory access operation was performed. Disabling the enable mode can include applying a control signal to the sector to disable the one or more bits associated with the sector.

Further details with regards to the operations of the access granularity management component 113 are described below.

Figure 2:
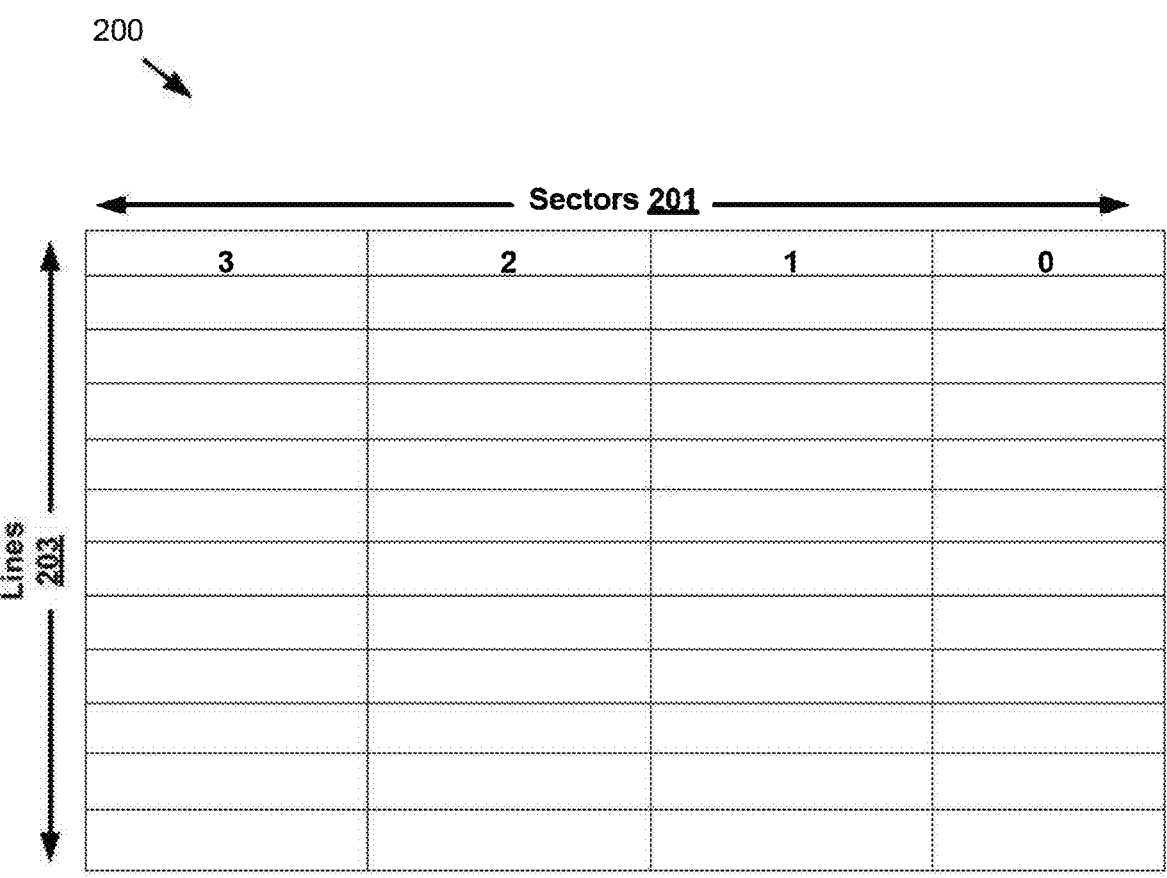
FIG. 2 is a block diagram illustrating a sectored cache of a memory sub-system, in accordance with some embodiments of the present disclosure.

FIG. 2 is a block diagram illustrating a sectored cache and/or buffer of a memory sub-system (e.g., a CXL SSD device and/or the memory sub-system 110), in accordance with some embodiments of the present disclosure. As illustrated, the sectored cache can have a set of lines 203 (e.g., cache lines), where each line is segmented into a set of sectors 201. The number of lines 203 and sectors 201 of a sectored cache can be dependent on design specifications of a memory device. In some embodiments, the sectored cache can have a set of lines that are segmented into 4 sectors (e.g., sector 0, sector 1, sector 2, sector 3). In some embodiments, each sector can be associated with a set of one or more bits. In some embodiments, each cache line 203 can be associated with another set of one or more bits. In some embodiments, a memory sub-system controller can apply control signals to each bit of each sector and/or cache line to enable or disable one or more modes, such as a write protection mode, an erase mode, an enable mode, a select mode, etc. In some embodiments, if a write protection mode associated with a sector is enabled, data cannot be written to that sector. In some embodiments, if a write protection mode associated with a sector is disabled, data can be written to that sector. In some embodiments, if an erase mode associated with a cache line is enabled, the data in each sector of the cache line can be reallocated and/or evicted. In some embodiments, if an erase mode associated with a cache line is disabled, the data in each sector of the cache line cannot be reallocated and/or evicted. In some embodiments, if the enable mode associated with a sector is enabled, data can be written to that sector. In some embodiments, if the enable mode associated with a sector is disabled, data cannot be written to that sector. In some embodiments, if a select mode associated with a sector is enabled, the select mode indicates that data is to be written to that sector. In some embodiments, if a select mode associated with a sector is disabled, the disabled select mode indicates that data is not to be written to that sector.

FIG. 3 is a block diagram illustrating examples of managing access granularity in a cache of a memory sub-system (e.g., a CXL SSD device and/or the memory sub-system 110), in accordance with some embodiments of the present disclosure. The cache can be equivalent to or similar to the sectored cache 200 illustrated with respect to FIG. 2. As illustrated in FIG. 3, there can be an initial cache line 301 with a set of sectors 0, 1, 2, and 3. The initial cache line 301 can be empty. There can be an enable ("En") mode bit associated with each sector of the cache line 301, where each enable mode is enabled (e.g., set to 1). There can be a write request (e.g., from a host device) to sector 1, as illustrated at cache line 303. Since the enable mode bit is enabled (e.g., set to 1), data from the write request is written to sector 1. In response to the data being written to sector 1, a write protection mode bit associated with sector 1 of the cache line 303 can be enabled (e.g., set to 1). In some embodiments, the enable mode bit associated with sector 1 of the cache line 303 can be disabled (e.g., set to 0) to indicate that sector 1 cannot be written to. In some embodiments, a select ("Se1") mode bit associated with sector 1 of the cache line can be enabled (e.g., set to 1) to indicate that sector 1 was the sector to be written to.

At cache line 305, there can be data retrieved from a backing store that is to be merged with the cache line 305 at each sector. Since the enable mode bit for sector 1 is disabled, the data from the backing store cannot be written to sector 1. Since the enable mode bit for sectors 0, 2, and 3 is enabled (e.g., set to 1), the data from the backing store is written to sectors 0, 2, and 3. In some embodiments, in response to the data from the backing store being written to the cache line, the write protection mode bit for each sector can all be disabled (e.g., set to 0). In some embodiments, the select mode bit associated with each sector of the cache line 305 can be enabled to indicate that the data retrieved from the backing store was to be written to each sector of the cache line 305.

At cache line 307, there can be a write request (e.g., from a host device) to sector 3. Since the enable mode bit for sector 3 is enabled (e.g., set to 1), data from the write request is written to sector 3. In response to the data being written to sector 3, a write protection mode bit associated with sector 3 of the cache line 307 can be enabled (e.g., set to 1). In some embodiments, the enable mode bit associated with sector 3 of the cache line 307 can be disabled (e.g., set to 0) to indicate that sector 3 cannot be written to. In some embodiments, a select mode bit associated with sector 3 of the cache line can be enabled (e.g., set to 1) to indicate that sector 3 was the sector to be written to. In some embodiments, at cache line 307, there can be an erase ("CLR") mode bit enabled (e.g., set to 1) to indicate that the cache line is to be reallocated or evicted.

FIG. 4 is a flow diagram of an example method of managing access granularity in a buffer of a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by access granularity management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic retrieves data from a backing store for merging at one or more sectors of a cache line in a cache (e.g., the sectored cache 200 of FIG. 2) of a memory sub-system (e.g., a CXL SSD device and/or the memory sub-system 110 of FIG. 1). In some embodiments, the backing store can be a memory device (e.g., the memory device 130 of FIG. 1). In some embodiments, the processing logic retrieves the data from the backing store in response to receiving a memory access request (e.g., a write request) from a host device, such as the host system 120 of FIG. 1.

At block 410, the processing logic determines whether each sector of the cache line is configured with at least one of a write protection mode and/or enable mode. In some embodiments, determining that a sector of the cache line is configured with the write protection mode can include determining that the write protection mode is enabled for that respective sector. In some embodiments, determining that a sector of the cache line is not configured with the write protection mode can include determining that the write protection mode is disabled for that respective sector. In some embodiments, determining that a sector of the cache line is configured with the enable mode can include determining that the enable mode is enabled for that respective sector. In some embodiments, determining that a sector of the cache line is not configured with the enable mode can include determining that the enable mode is disabled for that respective sector. In some embodiments, the processing logic can determine whether each sector of the cache line is configured with at least one of the write protection mode and/or enable mode based on one or more bits that are associated with each sector of the cache line. In some embodiments, each sector can be controlled (e.g., updated, modified, etc.) by each bit of the one or more bits associated with the sector. Each bit of the one or more bits associated with each sector can be part of an array of bits that form a control signal. In some embodiments, applying a control signal to each sector can enable or disable each bit of the one or more bits associated with each sector of the cache line.

At block 415, the processing logic writes the data from the backing store to each sector of the cache line. In some embodiments, the processing logic can write the data from the backing store to each sector of the cache line using the at least one of the write protection mode and/or enable mode as determined at block 410. For example, if the processing logic determines at block 410 that the write protection mode is disabled for a sector of the cache line, the processing logic can write the data from the backing store to that sector of the cache line. If the processing logic determines at block 410 that the write protection mode is enabled for a sector of the cache line, the data from the backing store is not written to that sector. In some embodiments, if the processing logic determines at block 410 that the enable mode is enabled for a sector of the cache line, the processing logic can write the data from the backing store to that sector of the cache line. If the processing logic determines at block 410 that the enable mode is disabled for a sector of the cache line, the data from the backing store is not written to that sector.

FIG. 5 is a flow diagram of an example method of managing access granularity in a buffer of a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by access granularity management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic receives a request from a host device (e.g., the host system 120 of FIG. 1) to perform a memory access operation (e.g., a write operation) at a sector of one or more sectors a cache line in a cache (e.g., the sectored cache 200 of FIG. 2) of a memory sub-system (e.g., a CXL SSD device and/or the memory sub-system 110 of FIG. 1).

At block 510, the processing logic determines whether the sector of the cache line is configured with an enable mode. In some embodiments, determining that the sector of the cache line is configured with the enable mode can include determining that the enable mode is enabled for that respective sector. In some embodiments, determining that the sector of the cache line is not configured with the enable mode can include determining that the enable mode is disabled for that respective sector. In some embodiments, the processing logic can determine that the enable mode is enabled and/or disabled based on one or more bits that are associated with the sector of the cache line. In some embodiments, each sector can be controlled (e.g., updated, modified, etc.) by each bit of the one or more bits associated with the sector. Each bit of the one or more bits associated with each sector can be part of an array of bits that form a control signal. In some embodiments, applying a control signal to each sector can enable or disable each bit of the one or more bits associated with each sector of the cache line.

At block 515, the processing logic performs the memory access operation at the sector of the cache line (e.g., the processing logic can write data to the sector of the cache line). In some embodiments, the processing logic performs the memory access operation in response to determining at block 510 that the sector of the cache line is configured with the enable mode.

At block 520, the processing logic configures the sector of the cache line at which the memory access operation was performed with a write protection mode. In some embodiments, configuring the sector of the cache line with the write protection mode can include enabling the write protection mode for the respective sector. In some embodiments, the processing logic enables the write protection mode in response to performing the memory access operation. Enabling the write protection mode can include applying a control signal to the sector to enable the one or more bits associated with the sector.

At block 525, the processing logic disables the enable mode associated with the sector of the cache line at which the memory access operation was performed. In some embodiments, the processing logic disables the enable mode in response to performing the memory access operation. Disabling the enable mode can include applying a control signal to the sector to disable the one or more bits associated with the sector.

At block 530, the processing logic retrieves data from a backing store for merging at one or more sectors of the cache line. In some embodiments, the backing store can be a memory device (e.g., the memory device 130 of FIG. 1). In some embodiments, the processing logic retrieves the data from the backing store in response to receiving a memory access request (e.g., a write request) from the host device.

At block 535, the processing logic determines whether each sector of the cache line is configured with at least one of the write protection mode and/or the enable mode. In some embodiments, determining that a sector of the cache line is configured with the write protection mode can include determining that the write protection mode is enabled for that respective sector. In some embodiments, determining that a sector of the cache line is not configured with the write protection mode can include determining that the write protection mode is disabled for that respective sector. In some embodiments, determining that a sector of the cache line is configured with the enable mode can include determining that the enable mode is enabled for that respective sector. In some embodiments, determining that a sector of the cache line is not configured with the enable mode can include determining that the enable mode is disabled for that respective sector. In some embodiments, the processing logic can determine whether each sector of the cache line is configured with the write protection mode and/or enable mode based on one or more bits that are associated with each sector of the cache line. In some embodiments, each sector can be controlled (e.g., updated, modified, etc.) by each bit of the one or more bits associated with the sector. Each bit of the one or more bits associated with each sector can be part of an array of bits that form a control signal. In some embodiments, applying a control signal to each sector can enable or disable each bit of the one or more bits associated with each sector of the cache line.

At block 540, the processing logic writes the data from the backing store to each sector of the cache line. In some embodiments, the processing logic can write the data from the backing store to each sector of the cache line using the at least one of the write protection mode and/or the enable mode as determined at block 535. For example, if the processing logic determines at block 535 that the write protection mode is disabled for a sector of the cache line, the processing logic can write the data from the backing store to that sector of the cache line. If the processing logic determines at block 535 that the write protection mode is enabled for a sector of the cache line, the data from the backing store is not written to that sector. In some embodiments, if the processing logic determines at block 535 that the enable mode is enabled for a sector of the cache line, the processing logic can write the data from the backing store to that sector of the cache line. If the processing logic determines at block 535 that the enable mode is disabled for a sector of the cache line, the data from the backing store is not written to that sector.

At block 545, the processing logic receives a request to perform an eviction operation on the cache line of the cache. In some embodiments, the processing logic can receive the request from the host device. In some embodiments, the processing logic can receive a request to perform a reallocation operation on the cache line of the cache. In some embodiments, the processing logic can receive the request from the host device.

At block 550, the processing logic configures the cache line with an erase mode. In some embodiments, configuring the cache line with the erase mode can include enabling the erase mode for the respective cache line. In some embodiments, the processing logic enables the erase mode in response to receiving the eviction operation and/or reallocation operation at block 545. In some embodiments, enabling the erase mode includes enabling a bit associated with each sector of the cache line. In some embodiments, applying a control signal to each sector can enable the bit associated with each sector of the cache line.

Figure 6:
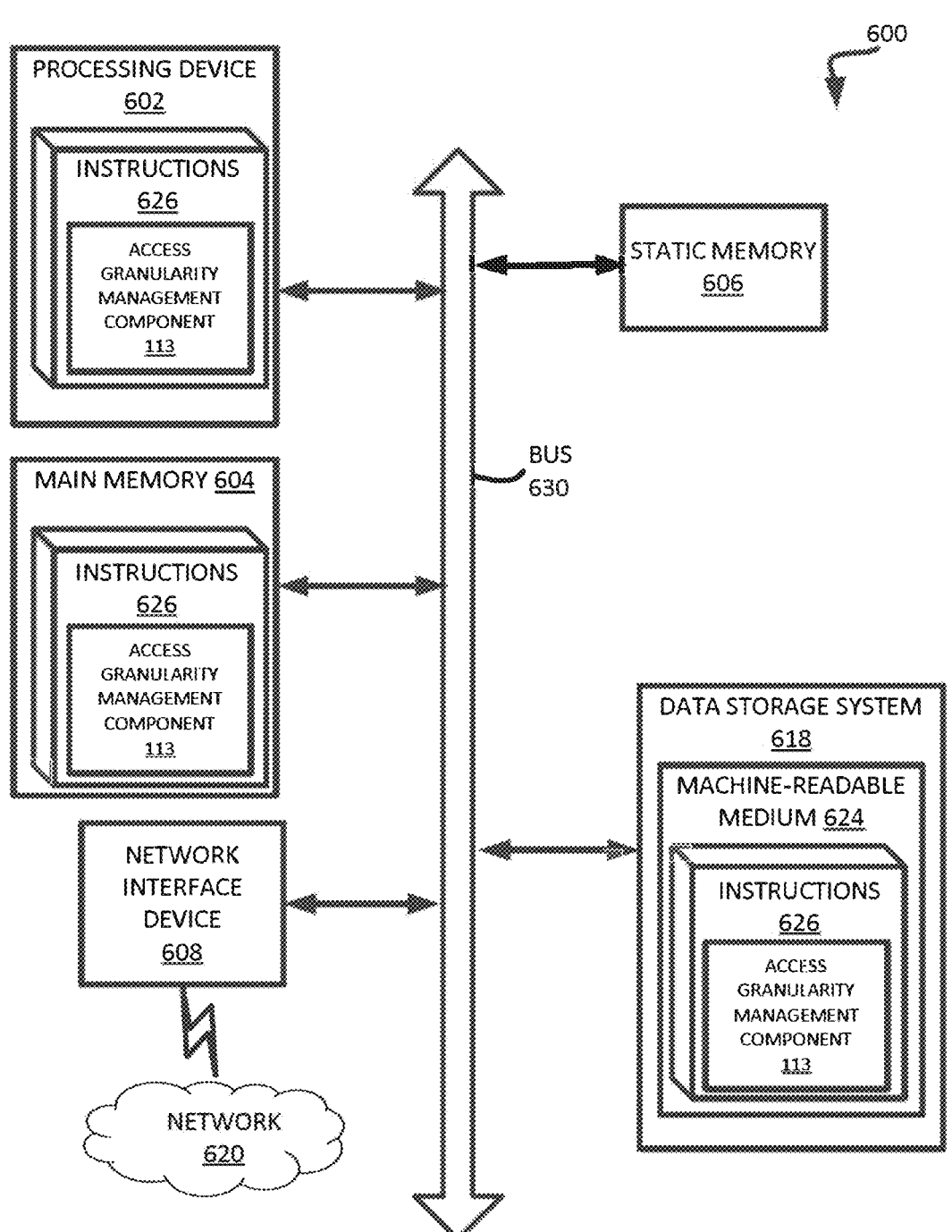
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the access granularity management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the access granularity management component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
retrieving data from the memory device for merging at one or more sectors of a cache line in a cache, wherein the cache line comprises a plurality of sectors;
determining, based on one or more bits associated with each sector of the cache line, whether each sector of the cache line is configured with at least one of a write protection mode or a write enable mode; and
writing the data from the memory device to a sector of the cache line for which the write protection mode is disabled or the write enable mode is enabled; and
merging received host data with the data from the memory device and stored at the sector of the cache line.

2. The system of claim 1, wherein the processing device is to perform operations further comprising:
receiving, from a host device, a request to perform a memory access operation at a sector of the cache line in the cache;
determining, based on the one or more bits associated with the sector of the cache line, whether the sector of the cache line is configured with the write enable mode;
responsive to determining that the sector of the cache line is configured with the write enable mode, performing the memory access operation at the sector of the cache line;
configuring the sector of the cache line with the write protection mode; and
disabling the write enable mode associated with the sector of the cache line.

3. The system of claim 1, wherein the processing device is to perform operations further comprising:
receiving a request to perform an eviction operation on the cache line in the cache; and
configuring the cache line with an erase mode, wherein configuring the cache line with the erase mode comprises enabling a bit associated with each sector of the cache line.

4. The system of claim 1, wherein the processing device is to perform operations further comprising:

receiving a request to perform a reallocation operation on the cache line in the cache; and configuring the cache line with an erase mode, wherein configuring the cache line with the erase mode comprises modifying a bit associated with each sector of the cache line.

5. The system of claim 2, wherein writing the data from the memory device to each sector of the cache line further comprises:

identifying each sector of the cache line associated with the write protection mode that is disabled; and responsive to identifying each sector of the cache line associated with the write protection mode that is disabled, writing the data from the memory device to each identified sector.

6. The system of claim 1, wherein writing the data from the memory device to each sector of the cache line further comprises:

identifying each sector of the cache line configured with the write enable mode; and responsive to identifying each sector of the cache line configured with the write enable mode, writing the data from the memory device to each identified sector.

7. The system of claim 1, wherein the one or more bits associated with each sector of the cache line are set using one or more control signals.

8. A method comprising:

retrieving, by a processing device, data from a memory device for merging at one or more sectors of a cache line in a cache, wherein the cache line comprises a plurality of sectors;

determining, based on one or more bits associated with each sector of the cache line, whether each sector of the cache line is configured with at least one of a write protection mode or a write enable mode;

writing the data from the memory device to a sector of the cache line for which the write protection mode is disabled or the write enable mode is enabled; and merging received host data with the data from the memory device and stored at the sector of the cache line.

9. The method of claim 8, further comprising:

receiving, from a host device, a request to perform a memory access operation at a sector of the cache line in the cache;

determining, based on the one or more bits associated with the sector of the cache line, whether the sector of the cache line is configured with the write enable mode;

responsive to determining that the sector of the cache line is configured with the write enable mode, performing the memory access operation at the sector of the cache line;

configuring the sector of the cache line with the write protection mode; and disabling the write enable mode associated with the sector of the cache line.

10. The method of claim 8, further comprising:

receiving a request to perform an eviction operation on the cache line in the cache; and configuring the cache line with an erase mode, wherein configuring the cache line with the erase mode comprises modifying a bit associated with each sector of the cache line.

11. The method of claim 8, further comprising:

receiving a request to perform a reallocation operation on the cache line in the cache; and configuring the cache line with an erase mode, wherein configuring the cache line with the erase mode comprises modifying a bit associated with each sector of the cache line.

12. The method of claim 9, wherein writing the data from the memory device to each sector of the cache line further comprises:

identifying each sector of the cache line associated with the write protection mode that is disabled; and responsive to identifying each sector of the cache line associated with the write protection mode that is disabled, writing the data from the memory device to each identified sector.

13. The method of claim 8, wherein writing the data from the memory device to each sector of the cache line further comprises:

identifying each sector of the cache line configured with the write enable mode; and responsive to identifying each sector of the cache line configured with the write enable mode, writing the data from the memory device to each identified sector.

14. The method of claim 8, wherein the one or more bits associated with each sector of the cache line are set using one or more control signals.

15. A non-transitory computer-readable storage medium comprising instructions that, when executed by a processing device, cause the processing device to perform operations comprising:

receiving a request to perform a memory access operation at a sector of a cache line in a cache, wherein the cache line comprises a plurality of sectors;

determining, based on one or more bits associated with the sector of the cache line, whether the sector of the cache line is configured with a write enable mode;

responsive to determining that the sector of the cache line is configured with the write enable mode, performing the memory access operation at the sector of the cache line;

configuring the sector of the cache line with a write protection mode using a first set of one or more control signals; and disabling the write enable mode associated with the sector of the cache line using a second set of one or more control signals.

16. The non-transitory computer-readable storage medium of claim 15, wherein the instructions cause the processing device to perform operations further comprising:

retrieving data from the memory device for merging at one or more sectors of the cache line;

determining, based on the one or more bits associated with each sector of the cache line, whether each sector of the cache line is configured with at least one of the write protection mode or the write enable mode, respectively; and writing the data from the memory device to each sector of the cache line using the at least one of the write protection mode or the write enable mode.

17. The non-transitory computer-readable storage medium of claim 15, wherein the instructions cause the processing device to perform operations further comprising:

receiving a request to perform an eviction operation on the cache line in the cache; and configuring the cache line with an erase mode, wherein configuring the cache line with the erase mode comprises enabling a bit associated with each sector of the cache line.

18. The non-transitory computer-readable storage medium of claim 15, wherein the instructions cause the processing device to perform operations further comprising:

receiving a request to perform a reallocation operation on the cache line in the cache; and configuring the cache line with an erase mode, wherein configuring the cache line with the erase mode comprises modifying a bit associated with each sector of the cache line.

19. The non-transitory computer-readable storage medium of claim 16, wherein writing the data from the memory device to each sector of the cache line further comprises:

identifying each sector of the cache line associated with the write protection mode that is disabled; and responsive to identifying each sector of the cache line associated with the write protection mode that is disabled, writing the data from the memory device to each identified sector.

20. The non-transitory computer-readable storage medium of claim 16, wherein writing the data from the memory device to each sector of the cache line further comprises:

identifying each sector of the cache line configured with the write enable mode; and responsive to identifying each sector of the cache line configured with the write enable mode, writing the data from the memory device to each identified sector.

\* \* \* \* \*